United States Patent
Hsieh et al.

(10) Patent No.: US 8,040,991 B2
(45) Date of Patent: *Oct. 18, 2011

(54) METHOD AND APPARATUS FOR SYNCHRONIZING MULTIMEDIA DATA STREAM

(75) Inventors: Ming-Jane Hsieh, Taipei (TW); Chia-Wei Yu, Taipei (TW); Yung-Cheng Hsiung, Chang-Hua (TW); DeHuei Chen, Taipei (TW)

(73) Assignee: Realtek Semiconductor Corp., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 12/846,887

(22) Filed: Jul. 30, 2010

(65) Prior Publication Data

US 2010/0289952 A1    Nov. 18, 2010

Related U.S. Application Data

(63) Continuation of application No. 11/456,858, filed on Jul. 12, 2006, now Pat. No. 7,787,578.

(30) Foreign Application Priority Data

Jul. 12, 2005 (TW) ................ 94123565 A

(51) Int. Cl.
*H04L 7/00* (2006.01)
(52) U.S. Cl. ............ 375/357; 375/240.25; 375/240.28; 375/354; 375/355; 375/362; 375/363; 375/365; 375/371; 375/376; 725/137; 725/136; 725/131; 725/139; 725/151; 348/500; 348/510; 348/512; 348/521; 348/524
(58) Field of Classification Search ............ 375/240.25, 375/240.28, 354, 355, 357, 362, 363, 365, 375/371, 376; 725/136, 137, 131, 139, 151, 100; 348/500, 510, 512, 521, 524, 526
See application file for complete search history.

(56) References Cited

U.S. PATENT DOCUMENTS

| | | | |
|---|---|---|---|
| 5,774,497 A * | 6/1998 | Block et al. ............... 375/226 |
| 6,182,074 B1 | 1/2001 | Astbury et al. | |
| 6,366,326 B1 | 4/2002 | Ozkan et al. | |
| 6,377,588 B1 | 4/2002 | Osaki | |
| 6,477,204 B1 | 11/2002 | Fukushima et al. | |
| 6,741,290 B1 * | 5/2004 | Wells ............... 348/512 |
| 6,931,071 B2 | 8/2005 | Haddad et al. | |
| 6,970,526 B2 | 11/2005 | Min | |
| 7,787,578 B2 * | 8/2010 | Hsieh et al. ............... 375/357 |
| 2002/0191107 A1 * | 12/2002 | Hu et al. ............... 348/515 |
| 2003/0095600 A1 | 5/2003 | Tsukagoshi | |
| 2003/0206605 A1 | 11/2003 | Anderson | |

(Continued)

FOREIGN PATENT DOCUMENTS

KR    100311464 B1    9/2001

(Continued)

*Primary Examiner* — Chieh M Fan
*Assistant Examiner* — Siu Lee
(74) *Attorney, Agent, or Firm* — Thomas, Kayden, Horstemeyer & Risley, LLP

(57) ABSTRACT

A method and an apparatus for synchronizing a data stream are disclosed. The method comprises: decoding the data stream to generate a decoded data stream and program clock references; generating a local clock reference; generating a simulated clock reference according to the program clock references and the local clock reference; comparing the local clock reference with the simulated clock reference; adjusting a processing timing of the decoded data stream according to the comparison result; and processing the decoded data stream according to the processing timing.

20 Claims, 2 Drawing Sheets

U.S. PATENT DOCUMENTS

| | | | | |
|---|---|---|---|---|
| 2004/0075766 A1* | 4/2004 | Schoner | ................ | 348/500 |
| 2005/0265254 A1* | 12/2005 | Yabuta et al. | ................ | 370/252 |
| 2006/0161675 A1 | 7/2006 | Ducharme et al. | | |
| 2007/0092224 A1* | 4/2007 | Tsukagoshi et al. | ............ | 386/96 |

FOREIGN PATENT DOCUMENTS

| | | |
|---|---|---|
| KR | 1020040070936 A | 8/2004 |
| TW | I227851 | 2/2005 |
| TW | 538631 | 7/2010 |

* cited by examiner

| | PCR offset | PCR (Y) | Local counter value (X) | PCR' (Y') | $y' = m \cdot x + B$ |
|---|---|---|---|---|---|
| T=$t_0$ | $PCR_0$ | $PCR_0$ | $LC_0 = 0$ | $PCR_0'$ | $PCR_0' = m \cdot LC_0 + B + PCR_0$ |
| T=$t_1$ | $PCR_0$ | $PCR_1$ | $LC_1$ | $PCR_1'$ | $PCR_1' = m \cdot LC_1 + B + PCR_0$ |
| T=$t_2$ | $PCR_0$ | $PCR_2$ | $LC_2$ | $PCR_2'$ | $PCR_2' = m \cdot LC_2 + B + PCR_0$ |
| T=$t_3$ | $PCR_0$ | $PCR_3$ | $LC_3$ | $PCR_3'$ | $PCR_3' = m \cdot LC_3 + B + PCR_0$ |
| ....... | ....... | ....... | ....... | ....... | ....... |
| T=$t_k$ | $PCR_0$ | $PCR_k$ | $LC_k$ | $PCR_k'$ | $PCR_k' = LC_k \times m + B + PCR_k$<br>$PCR_k'$ v.s $PCR_k$ |

Fig. 2

METHOD AND APPARATUS FOR SYNCHRONIZING MULTIMEDIA DATA STREAM

CROSS-REFERENCE TO RELATED APPLICATION

The present application is a continuation of U.S. patent application Ser. No. 11/456,858, filed Jul. 12, 2006, which claimed priority to Taiwan application number 094123565, filed Jul. 12, 2005. The contents of these applications are incorporated herein by reference.

BACKGROUND OF THE INVENTION

1. Field of the Invention

The present invention generally relates to a multimedia data stream, and more particularly, to a method and an apparatus for synchronizing a multimedia data stream.

2. Description of the Prior Art

When processing a multimedia data stream, it is crucial that the synchronization of data included in the multimedia data stream be accurately controlled. Digital television (DTV) for example, comprises a video data stream, an audio data stream, and a plurality of program clock reference (PCR) values within its multimedia data stream. The PCR values included in the multimedia data stream are utilized by a DTV receiver as a reference basis. The DTV receiver further refers to decoding time stamps (DTS) and presentation time stamps (PTS) included in the video data stream to process the video data stream. Similarly, the DTV receiver also refers to presentation time stamps (PTS) included in the audio data stream to process the audio data stream.

In the prior art, a phase lock loop (PLL) is utilized to generate a local clock. Counter values accumulated through counting the local clock are used as a local clock reference for approaching the program clock reference (PCR) of the multimedia data stream. However, the local clock reference does not accurately approach the PCR of the multimedia data stream, and problems will occur in the synchronization process for the video and audio data streams of the multimedia data stream.

SUMMARY OF THE INVENTION

One of the objectives of the present invention is to provide a method and an apparatus for synchronizing a multimedia data stream.

According to the embodiments of the present invention, a method for synchronizing a data stream is disclosed. The method comprises: decoding the data stream to generate a decoded data stream and program clock references; generating a local clock reference; generating a simulated clock reference according to the program clock references and the local clock reference; comparing the local clock reference with the simulated clock reference; adjusting a processing timing of the decoded data stream according to the comparison result; and processing the decoded data stream according to the processing timing.

According to the embodiments of the present invention, an apparatus for synchronizing a data stream is disclosed. The apparatus comprises: a decoder for generating a decoded data stream, and a plurality of program clock references; a timing control module for generating a simulated clock reference according to the program clock references and the local clock reference, and for comparing the local clock reference with the simulated clock reference to produce a comparison result; and a processor for adjusting a processing timing of the decoded data stream according to the comparison result, and for processing the decoded data stream according to the processing timing.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 2 shows a table illustrating the relationship between the simulated clock reference value Yi' and the program clock reference value Y.

DETAILED DESCRIPTION

Figure 1:
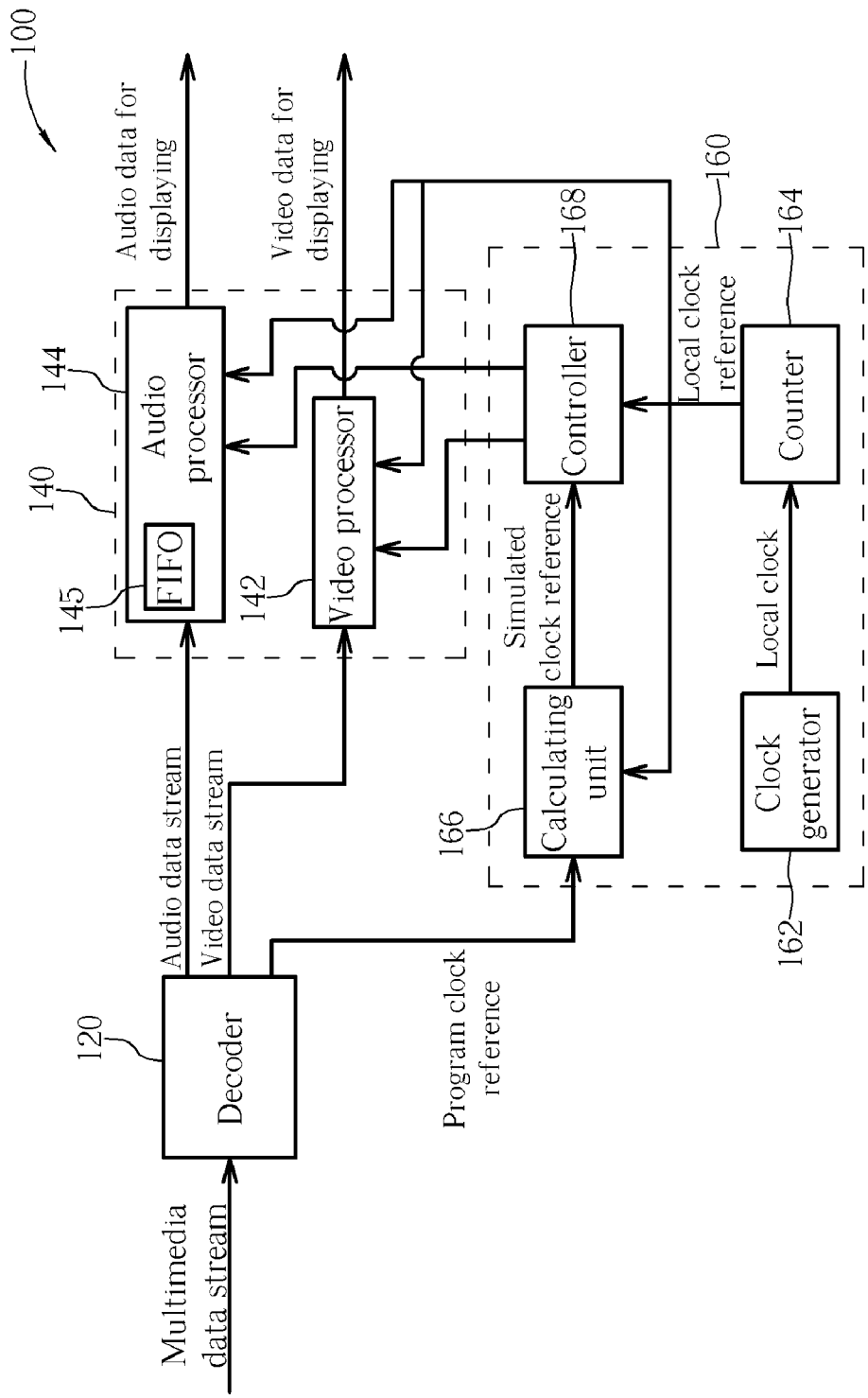
FIG. 1 shows an apparatus for processing a multimedia data stream according to an embodiment of the present invention.

FIG. 1 shows an apparatus 100 for processing a multimedia data stream according to an embodiment of the present invention. The video and audio data generated by the apparatus 100 can be further sent to other devices, such as a video display and speakers for performing the playback process.

The apparatus 100 comprises a decoder 120, a processor 140, and a timing control module 160. The decoder 120 decodes the multimedia data stream to generate a decoded data stream. In this example, the decoded data stream includes a video data stream and an audio data stream. The video data stream and audio data stream are then sent to the processor 140. The decoder 120 further extracts the clock reference values, including the program clock reference (PCR) values, and sends the extracted program clock reference values to the timing control module 160. The program clock reference values extracted from the multimedia data stream help constitute a program clock reference for the timing control module 160.

The timing control module 160 comprises a clock generator 162, a counter 164, a calculating unit 166, and a controller 168. The clock generator 162 which can be implemented by a phase lock loop (PLL) or a delay lock loop (DLL) or a clock synthesizer generates a local clock. If the multimedia data stream received by the apparatus 100 conforms to DTV specifications, the frequency of the local clock is approximately 27 MHz. The counter 164 generates a local counter value (LC) by counting on the local clock. The local counter value constitutes a local clock reference. Also worth note is that a timer could also be used to generate the local clock reference. The processor 140 comprises a video processor 142 and an audio processor 144, both utilized for respectively processing the video data stream and the audio data stream according to the local clock reference. For example, using the local clock reference as a basis, the video processor 142 processes the video data stream by referring to the decoding time stamps (DTS) and presentation time stamps (PTS) included in the multimedia data stream. The audio processor 144 would also processes the audio data stream by referring to the presentation time stamps (PTS) included in the multimedia data stream while using the local clock reference as a basis.

The calculating unit 166 generates a simulated clock reference according to the local clock reference and the program clock reference (PCR) values extracted from the multimedia data stream. The simulated clock reference is utilized to approach the PCR provided by the DTV transmitter, which transmits the PCR values intermittently. In the following equations, the variable x is used to represent the local clock reference, the variable y is used to represent the program clock reference provided by the DTV transmitter, and the variable y' is used to represent the simulated clock reference. For each local clock reference value Xi, the calculating unit 166 determines a value Yi' for the simulated clock reference according to the following equation:

$$y'=m \cdot x+B$$

System designers can then decide what kind of algorithm should be used in determining the two parameters m and B. For example, using the received program clock reference values Yi and the local clock reference values Xi, the calculating unit 166 can determine the parameters m and B to minimize the root mean square (RMS) of sum[(Yi−m·Xi−B)^2]. The simulated clock reference values Yi' corresponding to the local clock reference values Xi can then be determined according to the above equation. It is desired to have the system operate in such a way that counter 164 is reset by the timing control module 160 when a first program clock reference value Y1 is received. The first program clock reference value Y1 is then utilized as an offset for the simulated clock reference value corresponding to a subsequently generated local clock reference value. In theory, the variation rate of the simulated clock reference should be the same as the variation rate of the local clock reference. FIG. 2 shows a table illustrating the relationship between the simulated clock reference value Yi' and the program clock reference value Y.

In this embodiment, the controller 168 compares the local clock reference with the simulated clock reference, and directs the processor 140 to adjust the processing timing of the decoded data stream accordingly. More specifically, if it detects that the variation rate of the local clock reference is faster than the variation rate of the simulated clock reference, the controller 168 will direct the processor 140 to delay the processing timing of the decoded data stream. For the video data stream, the controller 168 can use the video processor 142 to insert at least one additional video sample (e.g. at least one video pixel or at least one horizontal line) in the blanking area of a frame of the video data stream. For the audio data stream, the controller 168 can use the audio processor 144 to insert at least one additional audio sample in the audio data stream. The controller 168 can also make use of the audio processor 144 to decrease the frequency of processing in the audio data stream within a period (i.e. processing k−n audio samples in the period originally for processing k audio samples). The additional audio and video sample(s) inserted can be generated through an interpolation algorithm.

On the other hand, if it is found that the variation rate of the local clock reference is slower than the variation rate of the simulated clock reference, the controller 168 directs the processor 140 to advance the processing timing of the decoded data stream. For the video data stream, the controller 168 can use the video processor 142 to skip at least one vertical line or horizontal line in the blanking area of the video data stream. For the audio data stream, the controller 168 can use the audio processor 144 to skip at least one audio sample in audio data stream. The controller 168 can also use the audio processor 144 to increase the frequency of processing in the audio data stream within a period (i.e. processing k+n audio samples in the period originally for processing k audio samples). The advancing or delaying of the processing timing in the video data stream and audio data stream must be performed such that the synchronization requirements are satisfied.

In addition, the audio processor 144 can further comprise a first-in-first-out (FIFO) buffer 145. The timing control module 160 can further control the processor 140 to adjust the processing timing of the decoded data stream according to the buffer occupancy of buffer 145. As an example, if the buffer occupancy of buffer 145 is large, the timing control module 160 directs the processor 140 to advance the processing timing of the multimedia data stream. If the buffer occupancy of buffer 145 is small, the timing control module 160 would direct the processor 140 to delay the processing timing of the multimedia data stream.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for synchronizing a data stream, comprising:
   generating a plurality of program clock references from the data stream;
   generating a local clock that is independent of the program clock references;
   generating a local clock reference based on the local clock;
   generating a simulated clock reference according to the program clock references and the local clock reference;
   adjusting a processing timing of a decoded data stream based on a comparison between the local clock reference and the simulated clock reference; and
   processing the decoded data stream according to the adjusted processing timing.

2. The method of claim 1, wherein the step of adjusting comprises:
   inserting or skipping a data in the decoded data stream.

3. The method of claim 2, wherein the step of adjusting comprises:
   decreasing or increasing a frequency of processing the decoded data stream.

4. The method of claim 2, wherein the decoded data stream comprises an audio data stream and a video data stream.

5. The method of claim 1, wherein the step of adjusting comprises:
   decreasing or increasing a frequency of processing the decoded data stream.

6. The method of claim 1, wherein the step of adjusting comprises:
   inserting or skipping a video sample in a blanking area of a frame of a video data stream of the decoded data stream.

7. The method of claim 6, wherein the step of adjusting comprises:
   inserting or skipping at least an audio sample in an audio data stream of the decoded data stream.

8. The method of claim 1, wherein the step of adjusting comprises:
   inserting or skipping at least an audio sample in an audio data stream of the decoded data stream.

9. The method of claim 1, wherein the step of comparing comprises:
   comparing a variation rate of the local clock reference with that of the simulated clock reference to produce the comparison result.

10. The method of claim 1, wherein the step of generating the simulated clock reference comprises:
    calculating a slope and an offset according to the local clock reference and the program clock reference; and
    obtaining the simulated clock reference according to the local clock reference, the slope, and the offset.

11. The method of claim 1, further comprising:
    providing a buffer for buffering the decoded data stream; and wherein the processing timing of the decoded data stream is adjusted according to a buffer occupancy of the buffer.

12. An apparatus for synchronizing a data stream, comprising:
- a decoder for generating program clock references from the data stream;
- a timing control module, coupled to the decoder, the timing control module comprising:
  - a clock generator configured to generate a local clock independent of the program clock references;
  - a counter configured to receive the local clock and generate a local clock reference;
  - a calculating unit configured to generate a simulated clock reference based on the program clock references and the local clock reference; and
- a data processor, coupled to the decoder and the timing control module, for adjusting a processing timing of a decoded data stream according a comparison of the local clock reference and the simulated clock references for processing the decoded data stream according to the processing timing.

13. The apparatus of claim 12, wherein the data processor adjusts the processing timing of the decoded data stream by inserting or skipping data in the decoded data stream.

14. The apparatus of claim 12, wherein the data processor adjusts the processing timing of the decoded data stream by increasing or decreasing a frequency of processing the decoded data stream.

15. The apparatus of claim 12, wherein the data processor adjusts the processing timing of the decoded data stream by inserting or skipping a video sample in a blanking area of a frame of a video data stream of the decoded data stream.

16. The apparatus of claim 12, wherein the data processor adjusts the processing timing of the decoded data stream by increasing or decreasing a frequency of processing an audio data stream of the decoded data stream.

17. The apparatus of claim 12, further comprising:
- a buffer for buffering the decoded data stream, wherein the data processor adjusts the processing timing according to a buffer occupancy of the buffer.

18. The apparatus of claim 12, wherein the timing control module compares a variation rate of the local clock reference with that of the simulated clock reference to produce the comparison result.

19. The apparatus of claim 12, the timing control module comprising:
- a calculating circuit for generating the simulated clock references according to the local clock references and the program clock references; and
- a comparing circuit for comparing the local clock reference and the simulated clock reference to produce the comparison result.

20. The apparatus of claim 12, the data processor comprising an audio processor and a video processor.

* * * * *